July 5, 1927.
P. MATTHEWS ET AL
1,634,910
COOLING APPARATUS FOR CREAM AND OTHER VISCOUS LIQUIDS
Filed Dec. 24, 1926    3 Sheets-Sheet 1
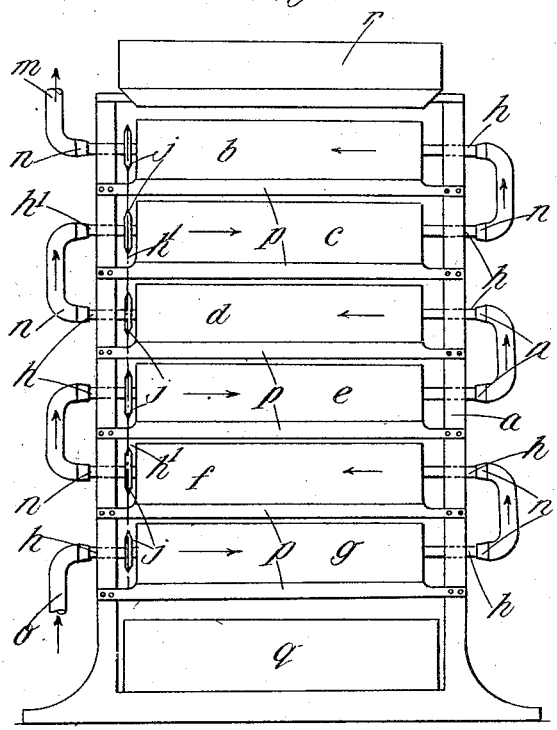
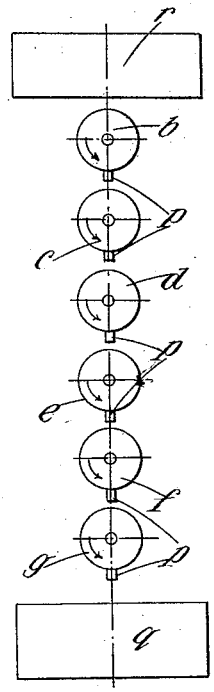
Inventors
PRYCE MATTHEWS,
ANDRE BRACHER,

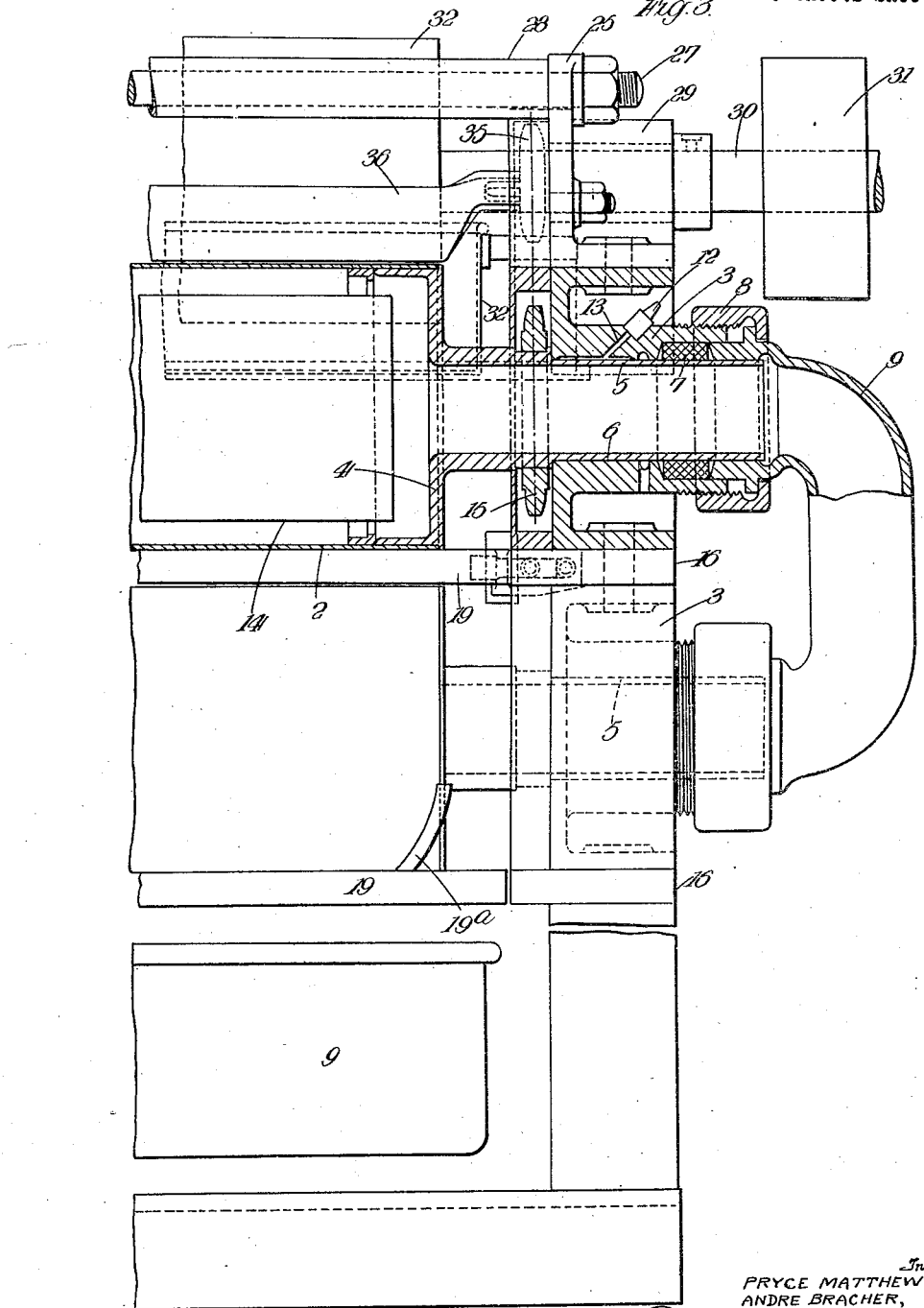

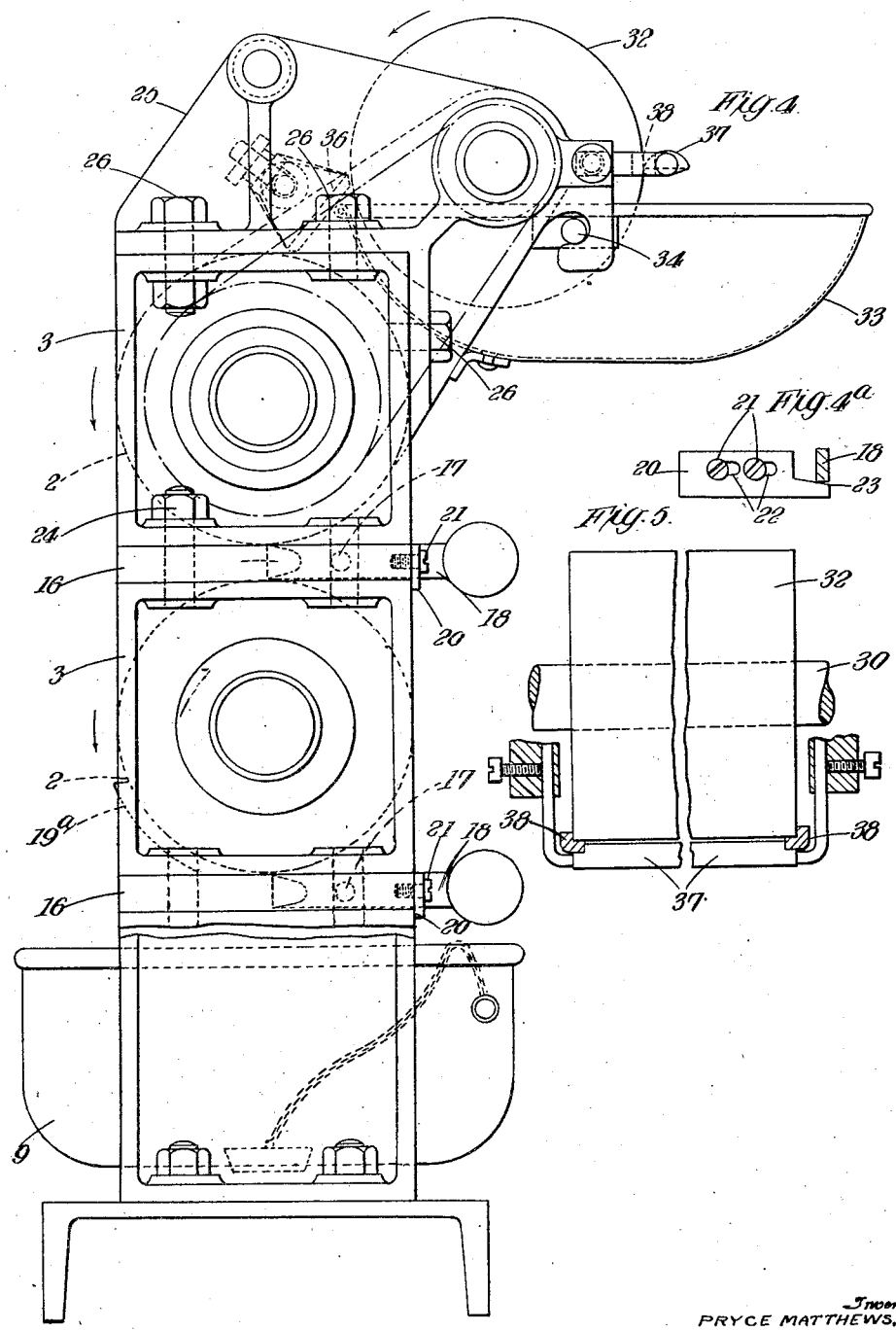

Patented July 5, 1927.

1,634,910

UNITED STATES PATENT OFFICE.

PRYCE MATTHEWS, OF WEST KENSINGTON, LONDON, AND ANDRÉ BRACHER, OF BERROW, BURNHAM-ON-SEA, ENGLAND.

COOLING APPARATUS FOR CREAM AND OTHER VISCOUS LIQUIDS.

Application filed December 24, 1926, Serial No. 156,958, and in Great Britain August 18, 1925.

This invention relates to cooling apparatus for cooling viscous liquids to low temperatures, particularly for cooling cream and other viscous milk products, to obtain efficient and uniform cooling as the substance to be cooled approaches solidification.

The object of this invention is to provide an apparatus whereby efficient and uniform cooling is effected.

The substance to be cooled is hereinafter referred to as cream.

Apparatus for cooling cream and other viscous liquids in accordance with this invention comprises a series of internally cooled rotating rollers, a feeder for feeding the cream onto one end of the series of cooling rollers, the cream being positively transferred from one cooling roller to the next in the series.

It should be understood that the term "positively transferred" includes all mechanical means, such as contact between the rollers or intermediate scrapers, but does not include transfer by gravity.

We are aware that it has been previously proposed to employ a method of evaporating the moisture from milk by passing it over a series of alternately heated and cooled cylinders arranged in a vacuum chamber, the milk passing from one roller to the next in the series by gravitation.

The rollers are preferably arranged vertically one above the other, but the invention is not restricted to such an arrangement, as the rollers may be placed in a row inclined to the horizontal, or again they may be placed in a horizontal row, or again they may be staggered, or any combination of the above arrangements. Also the rollers may be caused to rotate, all in one direction, or they may rotate alternately in opposite directions.

The means for passing cream from one roller to the next, and for preventing the cream from over-running the ends of the rollers, preferably comprises an adjustable scraper disposed between the rollers.

Instead of a single scraper we may use three scrapers, one straight and adjustable scraper for passing the cream to the next roller and two small curved scrapers (one at each end of the roller) for preventing the cream from over-running the ends of the roller.

A similar effect can be obtained by using a single scraper with curved ends.

If desired, the rollers may make contact with each other so that each roller collects the cream from the preceding roller. In this case the last moving roller would have a scraper to scrape off the cream and allow it to fall into the collecting trough.

If desired, the rollers may be enclosed and arranged to work in a vacuum.

Referring to the drawings filed herewith:

Fig. 1 is a diagrammatic side elevation of one form of cooler made in accordance with this invention;

Fig. 2 is an end elevation of Fig. 1;

Fig. 3 is a part sectional side elevation showing in greater detail one way of carrying out this invention;

Fig. 4 is an end elevation of Fig. 3;

Fig. 4$^a$ is a detail view showing the adjustment provided for the scrapers;

Fig. 5 is a detail view of the scrapers for limiting the feed of the feed roller.

Referring to Figs. 1 and 2, the cooling apparatus comprises a frame $a$ in which are mounted a plurality of hollow rollers $b$, $c$, $d$, $e$, $f$ and $g$. The spindles $h$ of the rollers are hollow and journalled in the frame $a$. Each spindle is provided with a sprocket $j$ engaging with a single chain $h'$ which drives all the six rollers. Cooling water or brine is fed into the rollers at $o$ through a watertight bearing $n$. Water circulates through the six rollers as shown by the arrow, each of the spindles being provided with a watertight bearing $n$. An outlet for the cooling water or brine is provided at $m$. Beneath each roller is a scraper $p$, and underneath the bottom scraper $p$, is a collecting trough $q$. $r$ is a container for the hot cream.

In operation, the cooling medium is caused to circulate through the rollers. The warm cream is allowed to flow from the tank $r$ onto the roller $b$ which is rotating. From the roller $b$ the cream is carried on down the series of rollers, being scraped by scrapers $p$, from the bottom of each roller onto the top of the next. The lower down the series of rollers the cream gets, the more it is cooled, and as its viscosity increases, any attempt to adhere to the rollers is frustrated by the scrapers $p$, which permits a perfectly clean cooling surface to be continually presented to the oncoming cream.

The cream scraped off the roller *g* falls into the collecting trough *q*.

Referring to Figs. 3 and 4, the cooling apparatus is preferably built up of a number of units, each unit consisting of a roller 2 and bearing blocks 3. The bearing blocks are so arranged that they may be formed one on top of the other so as to build up a cooler having any desired number of rollers, the apparatus for feeding the cream onto the upper roller being secured above the uppermost bearing block. The roller 2 is preferably constructed of thin sheet metal of approximately $\frac{1}{16}''$ thick and is provided with reinforced end pieces 4 having a hollow sleeve 5 formed thereon and journalled in the bearing block 3. The bearing block 3 is provided with a journal 6 to receive the sleeve 5 and in order to make a liquid-tight joint for the cooling water or brine which circulates through the rollers a packing 7 and gland nut 8 are provided, the gland nut 8 serving to press the bent connecting pipe 9 inwardly against the packing. The pipe 9 connects one roller to the next roller in the series. The packing 7 prevents any liquid circulating through the sleeve 5 and pipe 9 from escaping through the bearing. A lubricator 12 and passage 13 are provided for oiling the journal 6.

The rollers 2 may be plugged with filling pieces or plugs 14 so that only a small annular space is left between the plug and the walls of the roller. This serves to reduce the amount of liquid circulating in the rollers and consequently any desired variation in temperatures can be brought about more rapidly when there is a small amount of liquid in circulation. A chain sprocket wheel 15 is mounted on the sleeve 5 to receive the drive from the driving shaft. The description given above applies equally to the other units of which only two are shown in Figs. 3 and 4, but it is to be assumed any desired number of units may be mounted one above the other. Between the bearing blocks 3 is interposed a member 16 to which is pivoted at 17 a weighted lever 18. While only one lever is shown it is to be understod a similar lever is placed on the opposite side of the machine, a scraper bar 19 being secured between the two levers 18. The weighted levers 18 by virtue of their pivots 17 keep the scrapers pressed against the surface of the rollers. If desired, however, an adjustment may be provided for keeping the scrapers at any desired clearance from the roller in case it may be found necessary to leave a layer of cream on each roller. A suitable way of doing this is shown in Fig. 4ª, and comprises a sliding pawl 20 secured to the member 16 by two screws 21 working in slots 22. The pawl 20 is provided with an inclined face 23 upon which the lower edge of the weighted lever 18 rests; endwise movement of the pawl 20 will adjust the position of the levers 18.

Instead of weighted levers for the adjustable scraper springs can be used if desired.

Thus it will be seen that each of the scraper elements are a self-contained unit and are interposed between adjacent bearing blocks 3, the whole being held in position by bolts 24. At the base of the machine a collecting trough *q* is disposed so as to collect the cream scraped off the bottom roller. The device for feeding the hot cream onto the top roller again constitutes a separate unit and comprises a pair of brackets 25 bolted onto the top bearing blocks 3 by bolts 26 and clamped to one another by a screw rod 27, a distance piece 28 in the form of a long tube being interposed between the brackets; eyelets for suspending the apparatus may be attached to this rod to facilitate handling the apparatus when installing or shipping. The brackets 25 are provided with journals 29 in which is mounted the main driving shaft 30 carrying a driving pulley 31. Instead of a driving pulley on the shaft we may employ direct drive through a reduction gear and motor mounted on the cooler. On the driving shaft is mounted the feed roller 32 which dips into the receiving trough 33 the latter being secured by quickly detachable trunnions 34 formed on the brackets 25 so that the receiving trough may be removed for cleaning. The driving shaft 30 carries a chain sprocket wheel 35 whereby the drive is imparted through a chain (not shown) onto the roller below. A scraper 36 is provided to scrape the cream off the feed roller 32 and transfer it onto the top of the cooling roller below. In order to limit the amount of cream picked up by the feed roller, another scraper 37 is provided (see Fig. 4), adjustment means being provided for adjusting the clearance between the scraper and the feed roller. By the adjustment of this clearance the amount of cream picked up can be regulated as desired. It is also necessary to prevent the cream collecting at the ends of the feed roller and for this purpose we provide two small angle end scrapers 38 which scrape off any cream collected and return it to the trough (see Fig. 5).

If desired, knives or scrapers may be provided to scrape the cream which escapes over the ends of the cooled rollers and return the cream onto the working surface of the rollers. A diagrammatic form of curved scraper is designated by 19ª in Figs. 3 and 4. This may suitably be attached to the frame of the machine.

If desired, the series of rotating rollers can be used to make an extension for the existing form of corrugated cooler or coolers of that type. The hot liquid could easily be cooled with water to certain temperatures, on existing coolers, and then cooled to much lower temperatures, by attaching this invention to the end of the existing cooler.

What we claim and desire to secure by Letters Patent is:

1. Cream cooling apparatus comprising a series of internally cooled rotatable rollers adapted to positively transfer the cream from one roller to the next in the series by the said rollers revolving in the same direction to one another in contiguous relationship and a scraper adapted to remove the cream from the last roller in the series and to transfer it to a collecting receptacle, the cooling means for said rollers causing the circulation of a cooling medium successively from one roller to the other, the cooling medium entering the last roller and leaving the first roller in the series, so that the cream is gradually cooled as it passes over the series of rollers.

2. Cream cooling apparatus comprising a series of internally cooled rotatable rollers revolving in the same direction in spaced relationship, means for feeding cream to one end of the series of rollers, an adjustable scraper disposed between each roller adapted to positively transfer the cream from one roller to the next roller in the series and a final scraper adapted to transfer the cream from the last cooling roller in the series to a collecting receptacle, the cooling means for said rollers causing the circulation of a cooling medium successively from one roller to the other, the cooling medium entering the last roller and leaving the first roller in the series, so that the cream is gradually cooled as it passes over the series of rollers 3. Cream cooling apparatus comprising a series of internally cooled rotatable rollers adapted to receive a supply of cream to be cooled and to positively transfer the cream along the series from one roller to the next, the said rollers being arranged vertically one above the other, the cooling means for said rollers causing the circulation of a cooling medium successively from one roller to the other, the cooling medium entering the last roller and leaving the first roller in the series, so that the cream is gradually cooled as it passes over the series of rollers.

4. Cream cooling apparatus comprising a series of rotatable rollers, a receptacle for receiving the warm cream to be cooled located adjacent the first roller in the series, a receptacle for receiving the cooled cream located adjacent the last roller in the series, means for introducing a cooling medium into said last roller, circulating it through the several rollers and discharging it from the first roller in the series, and a separate rotatable feed roller adapted to pick up the warm cream in the first receptacle and feed it on to the first cooling roller in the series.

5. In cream cooling apparatus of the character described, a series of units, each unit comprising a roller and two bearing blocks, means for circulating a cooling medium successively through the several rollers, and a scraper unit interposed between adjacent pairs of the bearing blocks to transfer the cream from one roller to the next succeeding roller.

In testimony whereof, we affix our signatures.

PRYCE MATTHEWS.
ANDRÉ BRACHER.